US006193934B1

United States Patent
Yang (12)
(10) Patent No.: US 6,193,934 B1
(45) Date of Patent: Feb. 27, 2001

(54) CORONA-INDUCED CHEMICAL SCRUBBER FOR THE CONTROL OF $NO_x$ EMISSIONS

(75) Inventor: Chen-Lu Yang, Millburn, NJ (US)

(73) Assignee: Beltran, Inc., Brooklyn, NY (US)

( * ) Notice: Subject to any disclaimer, the term of this patent is extended or adjusted under 35 U.S.C. 154(b) by 0 days.

(21) Appl. No.: 09/158,045

(22) Filed: Sep. 22, 1998

(51) Int. Cl.$^7$ .......................... B01D 50/00; B01D 53/56; B01J 19/08
(52) U.S. Cl. ...................... 422/174; 422/169; 422/186.04
(58) Field of Search .................................. 422/169, 174, 422/186.04, 907; 60/275; 588/227; 204/179, 176, 177, 178

(56) References Cited

U.S. PATENT DOCUMENTS

| 4,695,358 | * | 9/1987 | Mizuno et al. ....................... 204/174 |
| 4,954,320 |   | 9/1990 | Birmingham . |
| 5,236,672 | * | 8/1993 | Nunez et al. .................... 422/186.04 |
| 5,534,659 | * | 7/1996 | Springer et al. ...................... 588/227 |
| 5,609,736 | * | 3/1997 | Yamamoto .............................. 204/164 |
| 5,817,283 | * | 10/1998 | Lani et al. ............................ 423/435 |
| 5,827,488 | * | 10/1998 | Babu et al. ........................... 423/235 |
| 5,866,753 | * | 2/1999 | Deam et al. .......................... 588/227 |

FOREIGN PATENT DOCUMENTS

93/17759 * 9/1993 (WO) .

OTHER PUBLICATIONS

Teng, Hsisheng, "Combustion Modifications of Batch Annealing Furnaces and Ammonia Combustion Ovens for $NO_x$ Abatement in Steel Plants," J.Air & Waste Manage. Assoc. vol.46, 1996.
EPA, "Control of $NO_x$ Emissions by Reburning," EPA/625/R—96/001, 1996.
Satterfield, Charles N., Heterogeneous Catalysis p 331–333 in Industrial Practice, Second edition, McGraw Hill, 1991.
Tri–Mer Corp., $NO_x$ Scrubber Improves Emissions, Pollution Equipment News, p. 52 Apr. 1997.

(List continued on next page.)

Primary Examiner—Shrive Beck
Assistant Examiner—Susan Ohorodnik
(74) Attorney, Agent, or Firm—Lawrence G. Fridman (57) ABSTRACT

An emission treatment system for removing oxides of nitrogen ($NO_x$), from flue gases includes in the pretreatment portion a continuous plasma reactor receiving and modifying the gaseous effluent by applying a plasma discharge thereto. The plasma discharge, upon application to the gaseous effluent, decomposes the majority of the gaseous effluent to nitrogen and oxygen and oxidizes nitric oxide to nitrogen dioxide. A preconditioning section is also provided for further modifying the gaseous effluent by washing the same with a mildly alkaline solution for removing ozone and lowering the process temperature. A continuous chemical scrubber uses an absorbent medium to substantially eliminate the nitrogen dioxide from the effluent and releases nitrogen and oxygen to the atmosphere.

6 Claims, 10 Drawing Sheets

OTHER PUBLICATIONS

Yang, Chen–Lu, Henry Shaw and Howard Perlmutter, Absorption of NO Promoted by Strong Oxidizing Agents: 1. Inorganic Oxychlorites In Nitric Acid, Chem. Engrg. Communications, Bol 143, 1996.

Shaw, Henry, "Aqueous Solution Scrubbing for $NO_x$ Control in Munitions Incineration," Presentation Dec. 5, 1976.

Yang, Chen–Lu, et al, "Oxidative Aqueous Scrubbing for Simultaneous $NO_x/SO_2$ Removal," Proceedings of the 1995 International Incineration Conference, Seattle, Washington, May 8–12, 1995.

Mizuno, Akira et al., Reactive Absorption of $NO_x$ Using Wet Discharge Plasma Reactor Nov. 1995.

Vogtlin, G E and B M Penetrante "Pulsed Corona Discharge for Removal of $NO_x$ from Flue Gas" 1993.

Penetrante Bernie M. "Non–thermal Plasma Reactors for Treatment of $NO_x$ and Other Hazardous Gas Emissions" 93.

McCabe Warren L., Julian C. Smith and Peter Harriott, Unit Operations of Chemical Engineering McGraw Hill 1985.

Birmingham Joseph G. Patrice S. Henderson Biological Aerosol Decomposition in a Reactive Bed Plasma (RBP) Reactor Futamura Shigeru and Toshiaki Yamamoto.

Control of Byproducts in Plasma Chemical Processing of Hazardous Air Pollutants (1997).

* cited by examiner

CORONA-INDUCED CHEMICAL SCRUBBER FOR THE CONTROL OF $NO_x$ EMISSIONS

FIELD OF THE INVENTION

This invention relates to oxides of nitrogen ($NO_x$) emission control, and, more particularly, to treating gaseous effluent with a plasma discharge before subjecting the effluent to a chemical scrubber.

BACKGROUND OF THE INVENTION

One of the most difficult problems related to air pollution control of boilers and incinerators is that of controlling the oxides of nitrogen ($NO_x$). The $NO_x$ emissions that result from the high temperature oxidation of nitrogen in combustion air are to a certain extent, controllable by in-furnace techniques of combustion modification and flue gas reburning. However, the 50% $NO_x$ reduction from these techniques is insufficient for compliance with Phase II Reasonable Available Control Technology (RACT) of the 1990 Clean Air Act Amendments requirements. As a result, the industry is now looking toward flue gas treatment technologies (FGT) to control $NO_x$ emissions, especially inasmuch as such processes are useful to achieve higher removal efficiencies. The FGT technologies are broadly classified as dry and wet techniques; dry techniques are further classified as selective catalytic reduction (SCR), selective noncatalytic reduction (SNCR), adsorption, and electron beam irradiation. Both dry catalytic processes and wet scrubbing processes have been applied in Japan for the treatment of $NO_x$ effluents from power plants. As of the late 1980s, more than 100 utility boilers in Japan had been equipped with SCR units. The SCR processes which operate at elevated temperatures are very difficult to apply to pollution sources containing oxides of sulfur, including sulfur dioxide, and particulates. The scrubbing processes require expensive oxidizing agents and, because of the high concentration of chlorides and nitrates in the spent scrubbing solution, present disposal problems. Recently, several studies have reviewed the use of nonthermal plasma technologies have been of interest for the control of $NO_x$ emissions. However, although previous results show that 90% of NO conversion is achievable, between 40% to 60% of the converted NO emerges from the reactor as $NO_x$. Thus, the total $NO_x$ destruction is only 55%—only a slight improvement over combustion modification technologies. In 1993, thorough review of nonthermal plasma reactors for $NO_x$ treatment was compiled and published by B.M.Penetrante.

"Control of $NO_x$ Emissions by Reburning", *Summary Report* [CERI, National Risk Management Research Laboratory, Office of Research and Development, U.S. Environmental Protection Agency (Febuary, 1996)] defines reburning as combustion modification, wherein the formation of $NO_x$ is minimized in one portion of the boiler and a portion of the $NO_x$ that is destroyed in another NO control employing reburning technology is described in 1996 as a new, effective method of controlling $NO_x$ emissions from a wide range of stationary combustion sources including large, coal-fired utility boilers. $NO_x$ emission control technologies that are capable of achieving $NO_x$ emission reduction from a coal-fired boiler are classified as either combustion modifications or post-combustion flue gas treatment. Combustion modification techniques prevent the formation of $NO_x$ during combustion or destroy the $NO_x$ formed during primary combustion. These techniques include the use of low-NO burners (LNBS), overf ire air (OFA), and boiler combustion optimization. Post-combustion flue gas treatment reduces the $NO_x$ content of the flue gas through techniques such as selective catalytic reduction (SCR) and selective noncatalytic reduction (SNCR).

Unlike some other $NO_x$ controls, for a wide variety of boilers, it is possible to implement reburning technology within a relatively short period of time. Reburning technology is particularly applicable to wet bottom (i.e.,slagging) boilers. For these boilers, the only other commercially available $NO_x$ control is flue gas treatment, which is more costly per ton of $NO_x$ reduction achieved.

It is known that reburning reduces $NO_x$ emissions by completing combustion in three stages. In the first stage, $NO_x$ formation resulting from interactions at high temperatures of the fuel and the combustion air at high temperatures is controlled by reducing the burner heat release rate and the amount of oxygen present. In the second stage, additional fuel is added under reduction (oxygen-deficient) conditions to produce hydrocarbon radicals that react with the $NO_x$ formed in the first stage nitrogen gas ($N_2$). Additional combustion air is added in a lower-temperature third stage and combustion is completed.

Besides the influx of reburning technology, nonthermal plasma has gained significance in the control of gaseous pollutants, especially $NO_x$ emissions, sulfates SOX (oxides of sulfur) emissions, and volatile organic compounds (VOCs), see A. Mizuno et al., *Reactive Absorption of $NO_x$ Using Net Discharge Plasma Reactor* [*IEEE Transactions of Industry Applications* Vol. 31, No. 6, (November/December, 1995)]. In $NO_x$ removal, the conventional selective catalytic reduction (SCR) method and the recently developed electron beam irradiation (EB) method both use ammonia injection to convert $NO_x$ into ammonium nitrate. For small scale plants or vehicles using diesel engines, as ammonia injection presents some safety hazards, this technique is not advisable. Alternately, investigations on nonthermal plasma processing indicates that the plasma created by electrical pulse discharge is suitable for controlling the $NO_x$ and soot in diesel engine exhaust. In the pulse discharge, NO gets converted to $NO_2$ which is absorbed by a liquid film maintained in the reactor. Such semiwet reactors are also adaptable for the collection of fine particles. In the application of the wet-type reactors discussed in this paper, it is suggested that about half of NO removed by the plasma dissociates into $N_2$ and $O_2$ and the rest is absorbed by water. The study also indicates that wet-type reactors performed better than the dry-type reactor in the removal of $NO_x$.

Nonthermal discharge devices are further reviewed by G. E. Vogtlin et al. in an article entitled "Pulsed Corona Discharge for Removal of $NO_x$ from Flue Gas," *NATO ASI Series,* Vol. G34, Part B [Springer-Verlag: Berlin, Heidelberg (1993)]. In this review, many types of nonthermal discharge devices used for environmental applications are discussed. All of the devices considered, operate on the same principle and produce a discharge in which a majority of the electric energy goes into the production of energetic electrons, rather than into gas heating. The authors found that although the energetic electrons are short-lived at atmospheric pressure and rarely collide with a pollutant molecule, many collisions occur with the dominant background gas molecules. The radicals produced, in turn, decompose the toxic compounds. The efficiency of the approach arises from the radicals having long lifetimes and reacting selectively with the contaminant molecules. The review article fund that these reactions create microdischarges, which yield large improvements in the power of efficiency. This results because, within the short lifetime of each microdischarge, the ions do not experience significant movement and do not contribute to power consumption. The short lifetime of these microdischarges is accomplished with the use of very-short voltage pulses (pulsed corona discharge) and/or with the use of dielectric coatings on the electrodes (dielectric barrier discharge).

Although there has been an extensive review of the technical literature, no system presently teaches toward the removal of substantially all the $NO_x$ content of flue gas emissions or combining of the pulsed corona discharge technology and of the chemical scrubber technology. The combination of these technologies is inhibited by the production during the pulsed corona discharge operation of ozone and other by-products, which products create hitherto unsolved technical problems. The ozone and other byproducts scavenge the $NO_2$ absorbent, such as sodium sulfite, and depletes the scrubbing solution. This results in the scrubber failing to absorb $NO_2$ from the effluent of the plasma discharge section. Under normal conditions, in the application disclosed hereinbelow, the plasma discharge generates an ozone concentration of about 5 to 10 times that of the concentration of the $NO_x$ in the effluent being treated. When ozone is present in such concentrations, because of the reactivity thereof, the ozone dominates the competition for the $NO_2$ absorbent in the scrubbing solution. Therefore, the scrubbing medium, e.g. sodium sulfite solution, is not efficiently used for $NO_2$ absorption. Additionally, the plasma unit creates by-products by oxidizing some of the nitric oxide, NO, to an $NO_3^-$ anion, which becomes a strong acid in solution and reduces the pH in the scrubbing solution. As the scrubbing solution is basic, the additional acidic input neutralizes and decomposes the sodium sulfite. It is further noticed that the use of corona treatment of effluents generates a certain amount of heat, which increases the temperature in the scrubber and causes the decomposition of the scrubbing medium. Finally, plasma discharge, especially DC and pulse plasmas, collect particles which accumulate in the scrubbing solution and cause plugging problems in the packed bed scrubber. The system disclosed for the control of $NO_x$ emissions, infra, overcomes these problems and further, does so in a way which complies with RACT standards.

SUMMARY

In general terms, the invention disclosed hereby includes a system for controlling effluents laden with oxides of nitrogen ($NO_x$). A nonthermal plasma discharge apparatus is used to decompose the gaseous mixture. At the plasma discharge treatment stage, the major portion of the incoming nitric oxide, NO, is decomposed to nitrogen, $N_2$, and oxygen, $O_2$ gases and the balance is oxidized to nitrogen dioxide, $NO_2$, which, in turn at the chemical scrubbing stage, is removed by a caustic sodium sulfite, aqueous scrubbing system. The effluent from the nonthermal plasma discharge device is preconditioned to remove ozone formed during the corona discharge and to reduce the temperature thereof. At least two dielectric materials, such as barium titanate and glass, can be used in the nonthermal plasma discharge unit for decomposing oxides of nitrogen, NO and $NO_2$, and oxidizing any remaining nitric oxide to nitrogen dioxide. The dielectric materials, either barium titanate or glass pellets, are packed into the annular space of the plasma reactors and forms a dielectric barrier. The plasma reactor using barium titanate destroys a significant quantity of NO in air stream at an appropiate electric field strength. A majority of the incoming NO is decomposed to $N_2$ and $O_2$. The balance or approximately 30% of the NO is oxidized to $NO_2$. Just as effective is another plasma reactor using glass pellets in a similar system which operates a 12 kV/cm electric field strength. The resultant gaseous mixture is then introduced into a chemical scrubber designed to scavenge the nitrogen dioxide from the mix. $NO_2$ in the effluent of the plasma reactor is then removed quantitatively by a caustic sodium sulfite aqueous scrubbing system. The outlet concentrations of both NO and $NO_2$ from the above plasma discharge/chemical scrubbing system (corona-induced chemical scrubber) are below the detection limit of the chemiluminescent $NO_x$ analyzer.

BRIEF DESCRIPTION OF THE DRAWINGS

Other advantages and features of the invention are described with reference to exemplary embodiments, which are intended to explain and not limit the invention and are illustrated in the drawings in which.

DESCRIPTION OF THE PREFERRED EMBODIMENT

Figure 1:
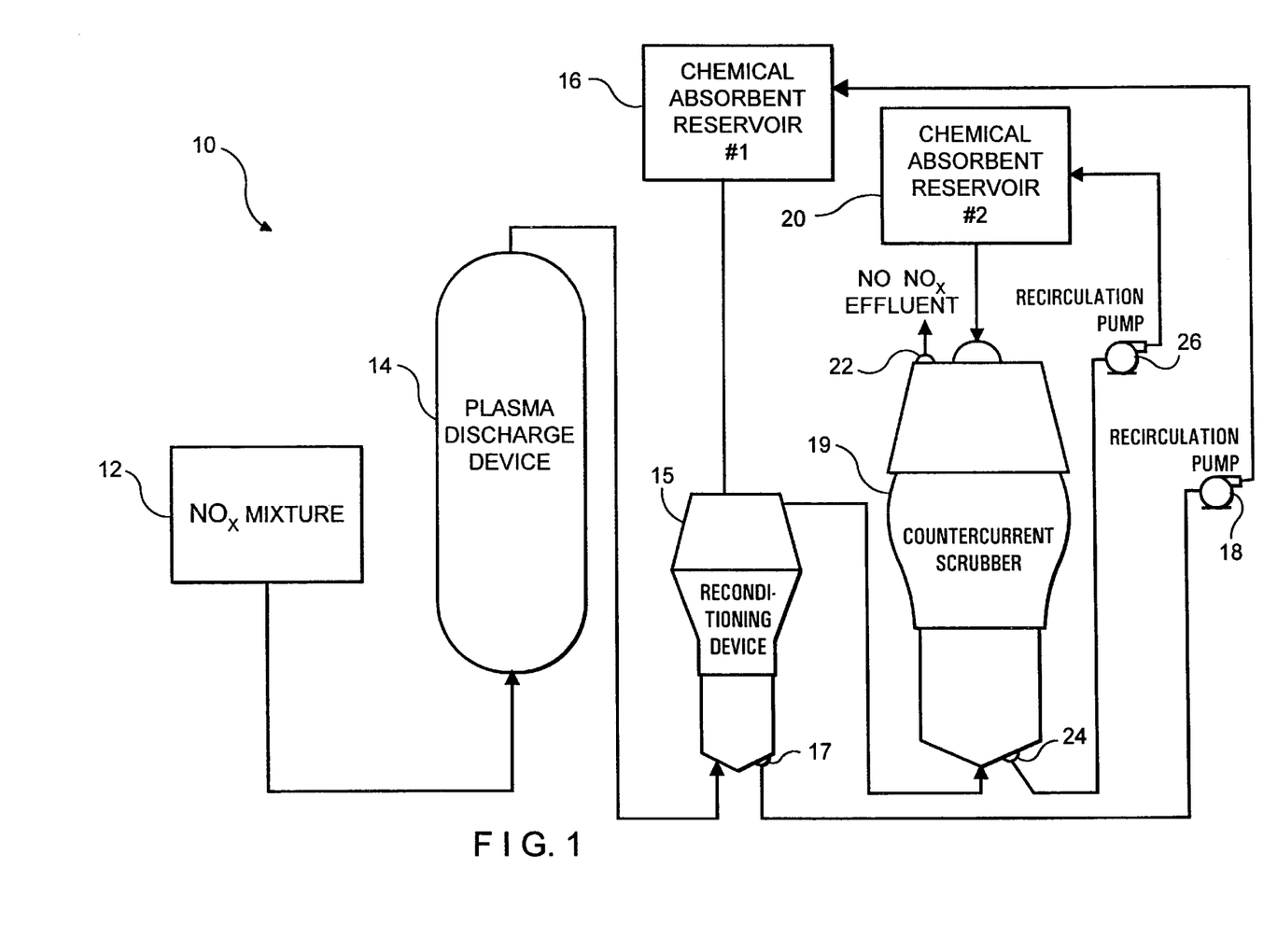
FIG. 1 is a schematic diagram of a corona-induced chemical scrubber for the control of $NO_x$ emissions of the present invention.

The system for control of oxides of nitrogen ($NO_x$) emissions of this invention is a two-phase treatment of the effluent. The system of the preferred embodiment in a simplified form is shown in FIG. 1, in which the corona-induced chemical scrubber is generally referred to by the numeral 10. The influent $NO_x$ mixture 12 is introduced into and pretreated at a plasma discharge device 14. The $NO_x$ mixture 12 has, depending upon the fuel quality and the combustion characteristics, varying levels of nitric oxide, NO, and nitrogen dioxide, $NO_x$. At the plasma discharge device 14, a plasma arc or corona is applied to the $NO_x$ mixture 12. Concomitantly, a process of decomposition and of oxidation occurs. The majority of the NO and $NO_2$ decomposes to nitrogen, $N_2$, and oxygen, $O_2$, gases and the balance thereof is oxidized to nitrogen dioxide, $NO_2$ and other decomposition by-products, including ozone and nitric acid anhydride. Thus, after pretreatment at the first phase, the effluent is a $N_2$, $O_2$, and $NO_2$ mixture with the other decomposition by-products. As illustrated by FIG. 1, this mixture is at one end thereof, in turn, fed into a preconditioning scrubbing section or device 15. At the opposite end of the preconditioning scrubbing section 15, a chemical absorbent is fed from a first chemical absorbent reservoir 16 so that the flows of the pretreated gaseous effluent and the absorbent are opposite one another. The preconditioning device 15, although shown as a separate functional element in FIG. 1, can be integrated with the plasma discharge device 14. The structure of the preconditioning device 15 is dependant upon the conditions of the flue gas streams and, while shown in FIG. 1 as a countercurrent scrubbing section, the device function could also be fulfilled by a venturi chamber with an ejector, a chamber with water sprayers, or a chamber with packing materials and sprayers. When the plasma discharge device 14 and the preconditioning device 15 are integrated, the unit taken as a whole, represents a pretreatment unit.

In the preconditioning device, a caustic aqueous solution is sprayed over the packing surfaces thereof so as to create a large interfacial area between the effluent and the liquid phases. At this stage, substantially all of the ozone is removed and the temperature is lowered so as not to interfere with the effectivity of the scrubber, infra. For the preconditioning device, the caustic is selected from any mild alkaline solution, such as for example, 0.1 M sodium hydroxide or calcium carbonate. After the caustic solution absorbs the ozone and lowers the process temperature, the resultant solution is released from the preconditioning device at outlet 17 and recirculates through recirculation pump 18 to the first chemical absorbent reservoir 16. At the reservoir, the pH of the absorbent is controlled to maintain the ozone-removing function. The effluent pretreated in the preconditioning device 15 is substantially a mixture of nitrogen, oxygen, and nitrogen dioxide gases. This mixture is fed into one end of countercurrent scrubber 19. At the opposite end of the scrubber 19, a chemical absorbent is fed from a second chemical absorbent reservoir 20, so that the flows of the pretreated gases effluent and the absorbent are opposite one another. Substantially, all of the nitrogen dioxide $NO_{21}$ is removed thereby and the resultant effluent of $N_2$ and $O_2$ are released to the atmosphere at port 22. The chemical absorbent solution is released at outlet 24 and recirculated through recirculation pump 26 to the chemical absorbent reservoir 20. At the reservoir 20, the concentration of the absorbent is controlled to maintain the scrubbing function.

Figure 2:
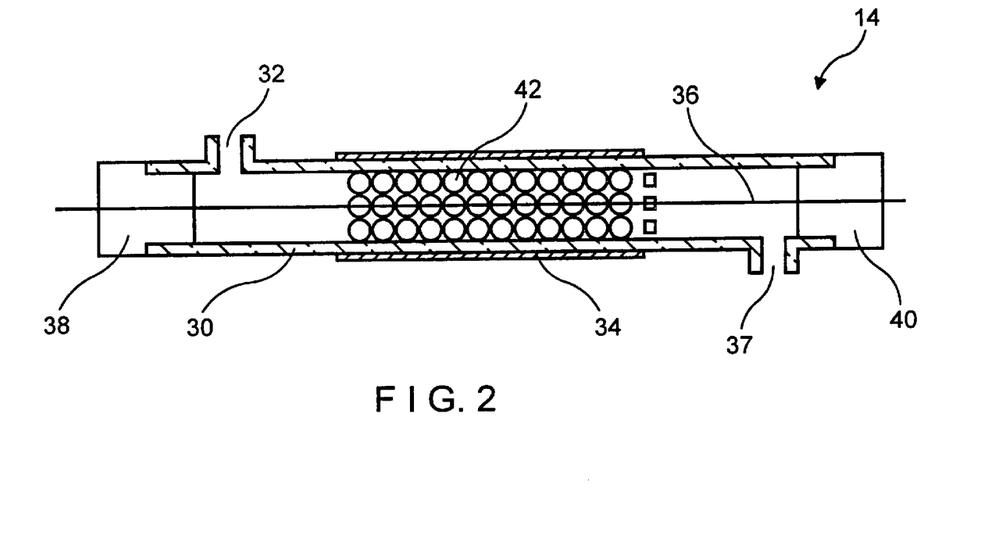
FIG. 2 is a detailed schematic diagram of the dielectric barrier packed bed plasma reactor portion of the corona-induced chemical scrubber of FIG. 1.

Referring now to FIG. 2, a schematic diagram of a plasma reactor or plasma discharge device 14 is shown. The plasma discharge device 14 has an outer wall 30 of heat-resistant glass. The gaseous mixture flows into the reactor at inlet or port 32 and is exposed to the corona discharge between the outer or copper mesh electrode 34 and the inner or discharge wire electrode 36. The discharge wire 36 is suspended between two end caps 38 and 40. Optionally and to enhance the functioning of plasma discharge device, a dielectric material 42 is employed. The processed gaseous mixture is discharged through an outlet or port 37. As discussed in detail below, among the dielectric materials used herein are barium titanate pellets and glass beads.

In determining the plasma reactor configuration, variables which effect the corona characteristics are considered. These include for the tubular plasma reactor, the corona current in the concentric-cylinder electrodes, the effects of wire and cylinder diameters, voltage waveforms, gas pressure and temperature and gas compositions. For the specific application in $NO_x$ emissions treatment, the result of corona currents versus applied voltages measurements are provided, infra. Without packings between discharge and ground electrodes (TPR), corona current in the setup described started at a voltage of at least 8 kV. While for normal electric circuits, the ratio of voltage and current is linear and is defined by Ohm's law as the resistance: for corona discharges, the ratio in a TPR provides a concave-up curve. This results as air and gases are good insulators under relatively low voltage, and when applied voltages exceed the 8KV threshold voltage, molecules of air begin to ionize and carry a charge to the ground electrode. This is the formation of corona current.

The corona characteristics of a packed bed plasma reactor, both glass bead (GPR) and barium titanate pellets (FPR) are next discussed. A packed bed plasma reactor has a characteristic V-I curve that substantially follows known scientific principles except for the current starting voltage. In the described system, a threshold on the range of 2–4 kv is found. Beyond the threshold, a linear relationship between corona current and applied voltages exists.

Nonthermal plasmas are often called cold combustion devices. This refers to the ability of such devices to produce active species by energy discharge in a similar manner to combustion devices. Although not completely understood, as most of the components in air are nitrogen and oxygen, there are sufficient reasons to believe that a plasma reactor produces a certain amount of nitrogen oxides in the course of operation. Tests presented herein are designed to identify the species of nitrogen oxides (NO and $NO_2$) produced in the plasma reactor and to quantify the equilibrium concentrations thereof.

The theoretical considerations for the construction of a packed scrubber are next provided. For a packed bed with an area of interface of a, a cross section of $\Omega$, and a height of dZ, the differential volume is $\Omega dz$. If the change in molar flow rate F is neglected, if y is the mole fraction of solute, and if y* is the equilibrium concentration, the amount absorbed in section dZ is −Fdy, which is equal to the absorption rate times the differential volume:

$$-Fdy = K_y a(y-y^*)\Omega dZ \tag{1}$$

This equation is rearranged for integration by grouping the constant factors F, $\Omega dz$, and $K_y a$ with dZ.

$$\frac{K_y a \Omega}{F} \int_0^Z dZ = \frac{K_y a \Omega Z_T}{F} = \int_b^a \frac{dy}{y-y^*} \tag{2}$$

The equation for the column height can be written as follows:

$$ZT = \frac{\frac{F}{\Omega}}{K_y a} \int_b^a \frac{dy}{y-y^*} \tag{3}$$

The integral in Equation 3 represents the change in vapor concentration divided by the average driving force and is called the number of transfer units, NTU or $N_{oy}$. The other part of Equation 3 has the unit of length and is called the height of transfer unit, HTU or $H_{oy}$.

The chemical reaction in the liquid phase reduces the equilibrium partial pressure of the solute over the solution, which greatly increases the driving force for mass transfer. If the reaction is essentially irreversible at absorption conditions, the equilibrium partial pressure is zero, and the $N_{oy}$ can be calculated just from the change in gas composition.

For $y^* = 0$.

$$N_{oy} = \int_b^a \frac{dy}{y} = \ln \frac{y_a}{y_b} \quad (4)$$

By utilizing the above equations, the $H_{oy}$ for $NO_2$ absorption of the present invention is obtainable.

Figure 3:
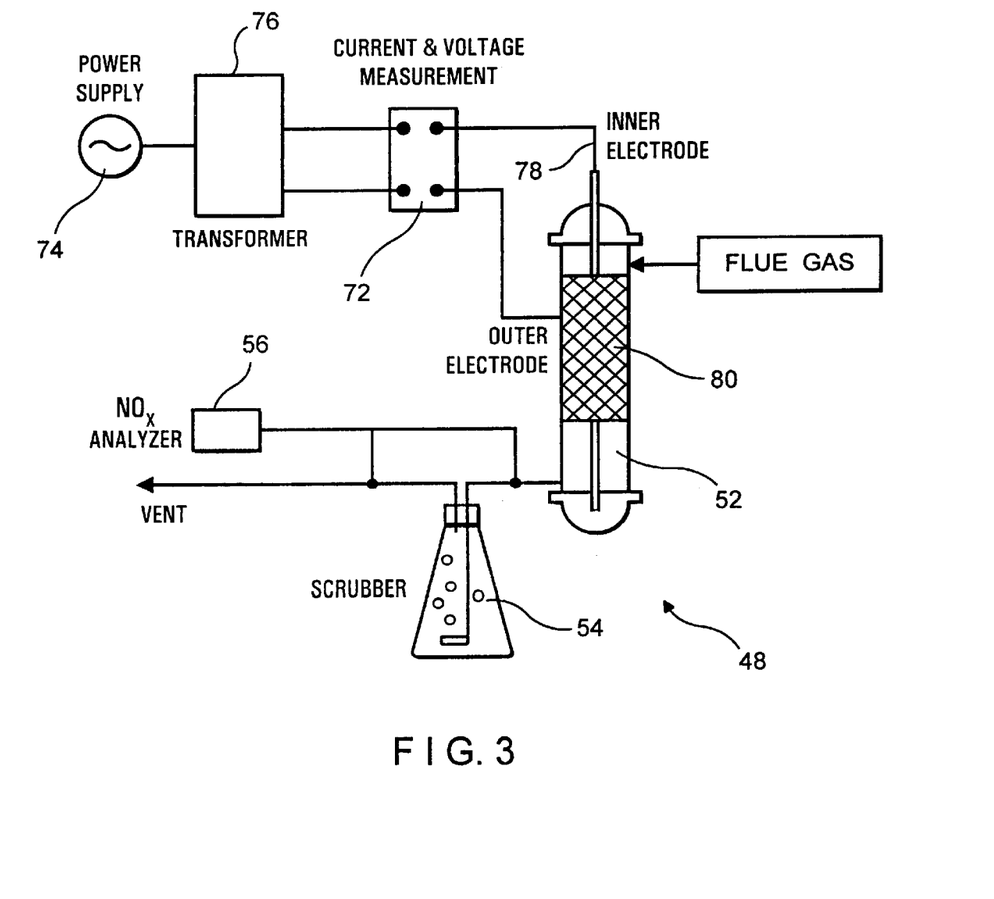
FIG. 3 is a schematic diagram of an embodiment of the invention utilizing a system with a tubular plasma reactor (TPR) and a bubbler scrubber.
Figure 4:
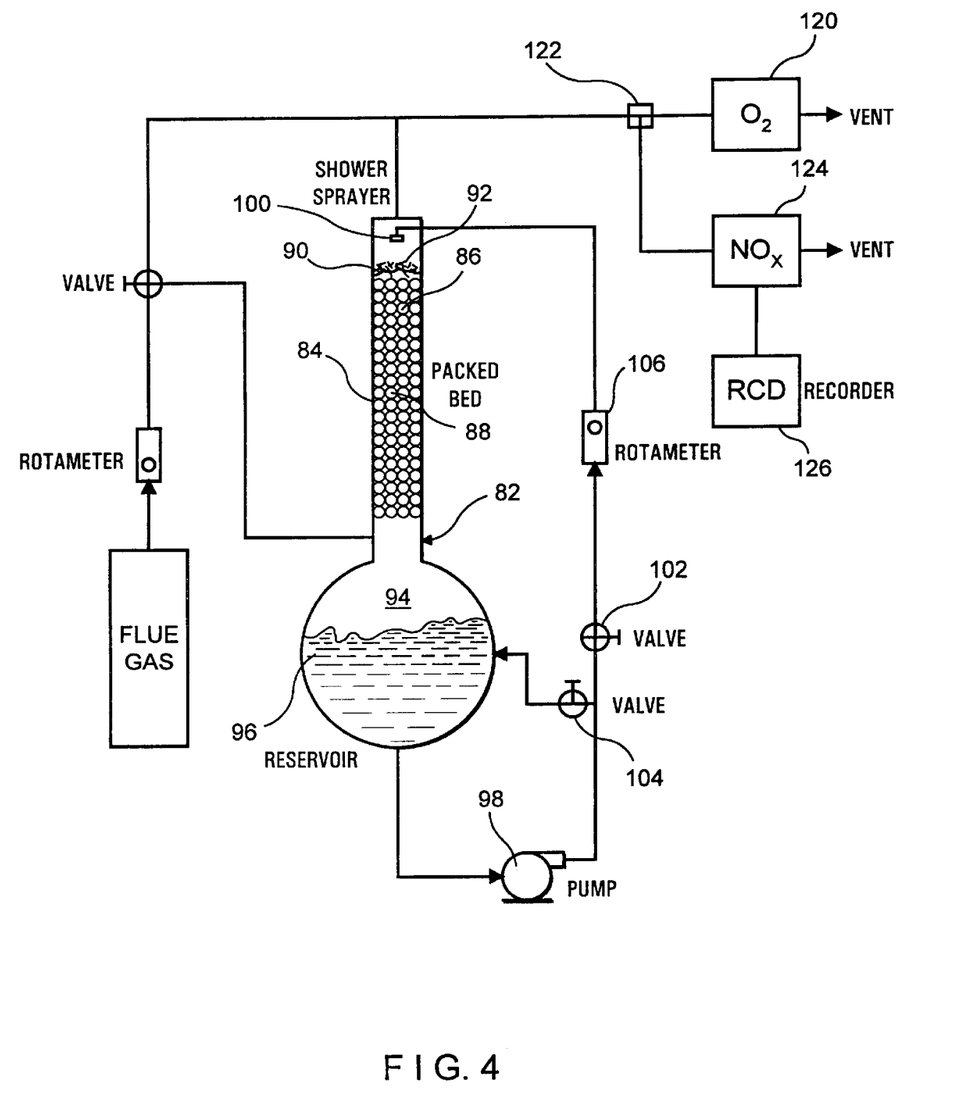
FIG. 4 is a schematic diagram of another embodiment of the invention utilizing a system with a packed bed chemical scrubber and a $NO_x$ emission simulator.

Taking the above theoretical considerations into account and referring now to FIGS. 3 and 4, arrangements for the corona-induced chemical scrubber system discussed above are shown. The system 48, shown in FIG. 3, consists of a set of interchangeable plasma reactors 52 (one of which is shown), a bubble column scrubber 54, and a continuous $NO_x$ analyzer 56. The flue gas passes through the plasma reactor 52 where NO is either decomposed to $N_2$ and $O_2$ or oxidized to $NO_2$. The data can be collected by monitoring the current and voltage at meter 72 interposed between power supply 74 with the associated transformer 76 and the inner and outer electrodes 78 and 80, respectively. The effluent gases are carried to the bubble column gas scrubber 54 where residual $NO_2$ is absorbed in the scrubbing solution. Gas samples are taken from the effluents of the plasma reactor and the chemical scrubber.

In the arrangement illustrated in FIG. 3, the tubular dielectric barrier plasma reactor (TPR) 52, is shaped in the form of coaxial cylinders with an inner metal electrode 78 and an outer tube made of glass. A copper screen in contact with the outside surface of the tube serves as the ground electrode 80. The inner electrode 78 is connected to a high voltage (0–30 kV), AC power supply 74 which can be operated at about 60 Hz. The glass tube serves as the reaction vessel and as a dielectric barrier to inhibit direct charge transfer between the electrodes. FIG. 2 shows how dielectric materials are added to the annular space of a TPR. Among dialectric materials, glass beads, hereinafter called GPR and barium titanate pellets, hereinafter called FPR can be used by the invention. The pellets significantly enhance NO decomposition by increasing the contact surface area and electric field strength.

FIG. 4 illustrates another embodiment of the invention having a packed bed scrubber utilizing a sodium sulfite aqueous solution for $NO_2$ absorption. The bed scrubber 82 is constructed of acrylic column 84 with a section having a packed bed 86 which is made by randomly packed polyethylene tubing 88. The top of the column holds a demister head 90 packed with glass wool 92 for removing entrained droplets from the gas stream. The entire column sits on a vessel which serves as the reservoir 94 for the scrubbing solution 96.

A circulating pump 98 withdraws the scrubbing solution 96 from the reservoir 94 and pumps the solution to a spray nozzle 100 at the top of the column 84. The solution 96 is then sprayed countercurrent to the gas flow. The rough pumping rate is controlled by regulating the recirculating rate at valves 102 and 104. A fine adjustment of the pumping rate is controlled by the flowmeter 106 between valve 102 and spray nozzle 100. The $No_x$ emission typically consists of $O_2$, $NO_2$, $NO_x$ and $N_2$. After passing through the packed bed scrubber 84, the effluent is exhausted to atmosphere at vent 120. The resultant effluent is sampled at sampling port 122 and $No_x$ analyzer 124 provides a record of the NO and $NO_2$ at recorder 126.

In order to ascertain the corona current, with and without the dielectric material packing, an ammeter 72, (See FIG. 3), is connected in series with the plasma reactor 52, which can be the tubular plasma reactor (TPR) having glass column. When used with dielectric materials, the column can be packed among other elements with 6 mm glass beads (GPR) or with barium titanate pellets (FPR).

Figure 5:
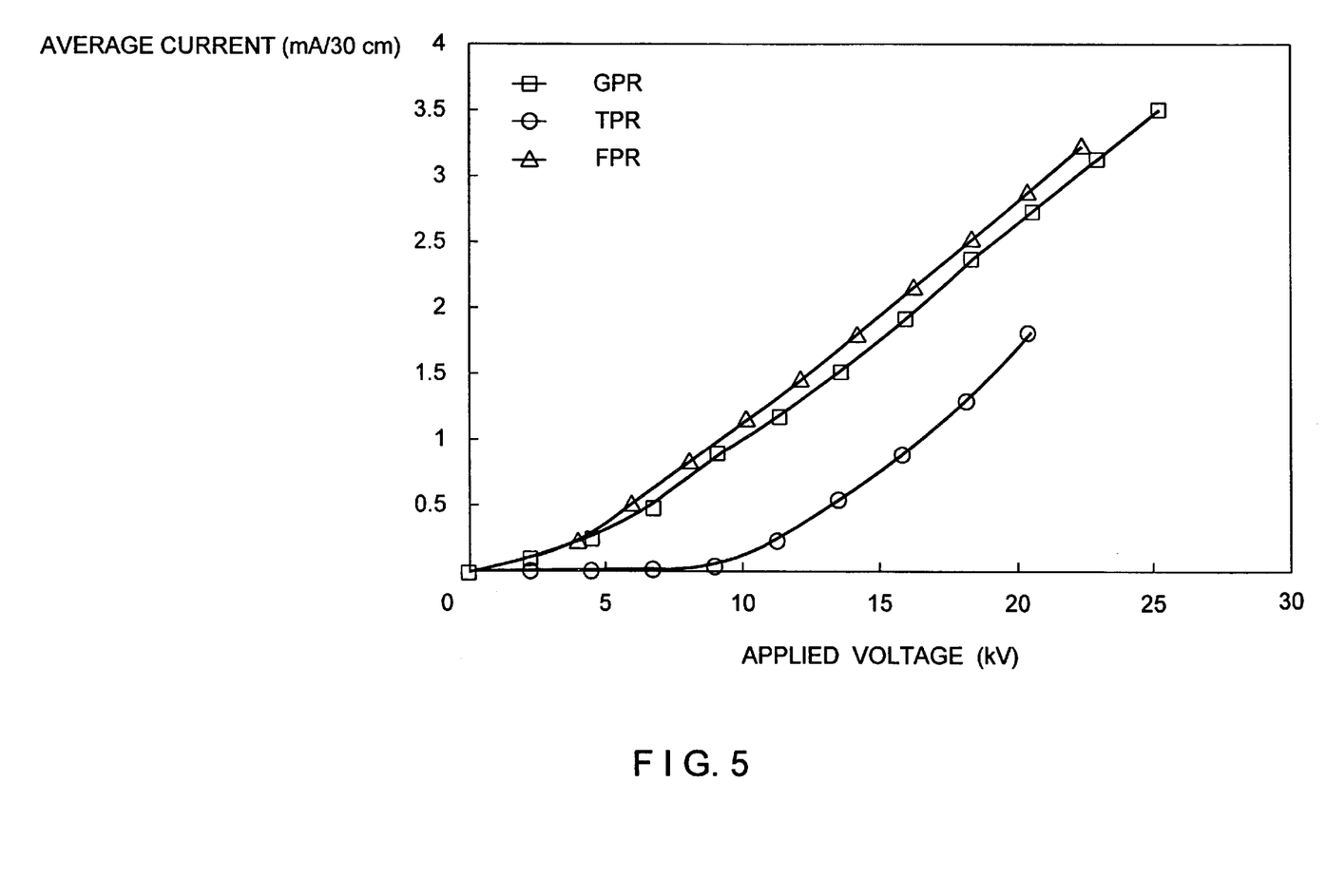
FIG. 5 is a graph showing the corona characteristics of a tubular plasma-reactor(TPR) and two other dielectric barrier plasma reactors wherein the dielectric material is barium titanate (FPR) and glass beads(GPR), respectively.

Referring now to FIG. 5 typical curves of the corona current are shown for the various plasma reactors, namely, TPR, GPR and FPR. In all cases, the discharge electrode 78 is a stainless steel wire and the ground electrode 80 is a mesh copper cloth. Under a loading condition of 2 liter per minute dry air, a voltage up to 25 kV, 60 Hz AC is applied.

EXAMPLE #1

In this example, the simulated $NO_x$ emission is pretreated in a tubular plasma reactor with a dielectric barrier of barium titanate (FPR). Because of the high dielectric constant of barium titanate, the pellets are viewed as refracting high-voltage electric fields so that the local fields between pellets are stronger than the applied field. The plasma-reacted $No_x$ emissions are further pretreated to remove the ozone therefrom and reduce the process temperature thereof. This phase is accomplished by reacting the ozone with a mild caustic solution, such as a 0.1M NaOH sollution. An appropriately sized scrubber section integral with the FPR is used in a countercurrent flow arrangement. The application of the caustic solution in this manner, reduces the temperature of the effluent stream. After pretreatment, the resultant effluent, now primarily $O_2$, $N_2$, and $NO_2$, is passed through a chemical scrubber which uses sodium bisulfite as the absorbent medium. The specifications for the tubular plasma reactor and the electrodes are as described above. The plasma reactor control applied voltages up to 25 kV at 60 Hz AC under various loading conditions of 2, 4, and 8 liters per minute, dry air.

Figure 6:
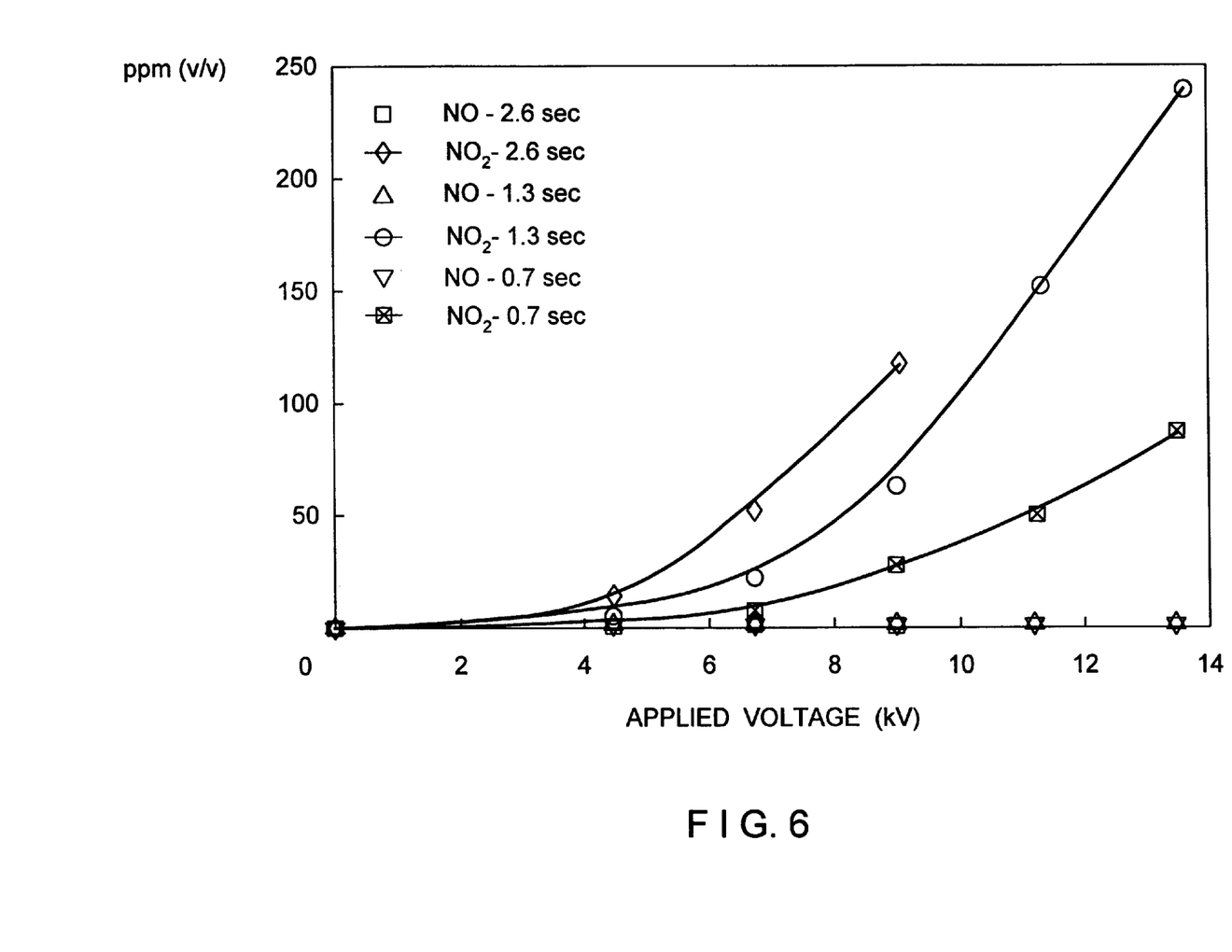
FIG. 6 is a graph showing the concentrations of NO and $NO_2$ as a function of residence in and voltages applied to the packed bed plasma reactor.

FIG. 6 shows the concentrations of NO and $NO_2$ as a function of residence time in and voltages applied to the packed bed plasma reactor. The residence times indicated in FIG. 6 are the reciprocals of space velocities. Space velocity is defined as the ratio of the flowrate and volume of the reaction chamber. Because of the barium titanate pellets in the reactor, the real reaction times are about a quarter of those calculated values. The operation at a loading of eight liters per minute is equal to a residence time of 0.7 second indicated in FIG. 6. The packed bed plasma reactor (FPR) produces a significant amount of $NO_2$ and no significant amount of NO. To fully absorb the residual $NO_2$ from the effluent of the plasma reactor would be needed in order to control all the $NO_x$. A number of runs were made with a 5% $Na_2SO_3$ solution as a scrubbing medium with a bench-scale chemical scrubber. The scrubber is an 8.6 cm I.D. by 60 cm long acrylic column packed with 1.3 cm O.D. by 1.4 cm long pollyethylene tubing. The scrubber utilizes as a scrubbing medium a 5% by weight solution of $Na_2SO_3$ at a flowrate of 3.5 liters per minute. The pretreated effluent is introduced into the scrubber at a flowrate of 35 to 75 liters per minute and runs in a countercurrent direction to the scrubbing medium. The $NO_2$ at the scrubber inlet is at a concentration of 90 to 125 ppm. The actual measurements from the above are summarized in Table 1.

TABLE 1

Removal of NO$_2$ by Sodium Sulfite Aqueous Scrubbing

| Scrubbing solution | Gas Flowrate (Lpm) | Concentration of NO$_2$ (ppm) | |
|---|---|---|---|
| | | Inlet | Outlet |
| Na$_2$SO$_3$ 5% by weight | 35 | 93 | 1.1 |
| | 43 | 103 | 2.8 |
| | 50 | 110 | 3.1 |
| | 58 | 112 | 6.4 |
| | 66 | 120 | 6.6 |
| | 74 | 114 | 7.8 |

Figure 7:
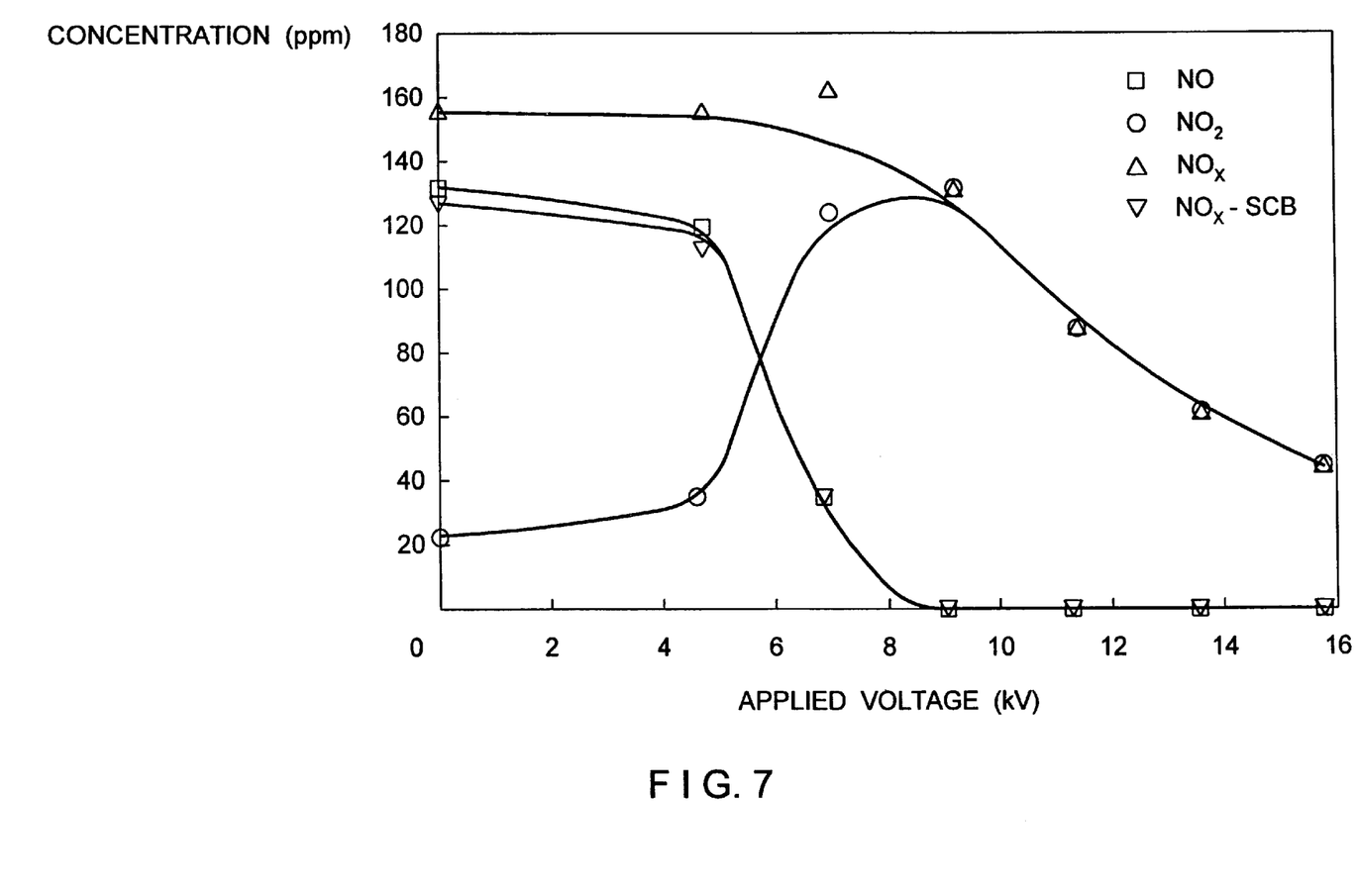
FIG. 7 is a graph showing the outlet concentrations of NO, $NO_2$, and $NO_x$ from a plasma reactor packed with barium titanate pellets and the outlet $NO_x$ concentrations from a chemical scrubber.

The data indicate that NO$_2$ is scrubbed effectively with sodium sulfite aqueous solution. The outlet concentration of NO$_2$ can be as low as 1.1 ppm. When measurements are taken at a gas flowrate lower than 35 liters per minute, the outlet concentrations are below the detection limit of the chemiluminescent analyzer. Referring now to FIG. 7, the outlet concentrations of NO, NO$_2$ and NO$_x$ of the plasma reactors with the barim titanate dielectric are shown together with a curve labeled "NOx-SCB," which is the NO$_x$ concentration in the chemical scrubber effluent. Concentrations of NO were superimposed on the curve indicated as NOx-SCB, which indicates that the scrubbing solution is effective in NO$_2$ absorption.

EXAMPLE #2

In this example, the simulated NO$_x$ emission is pretreated in a tubular plasma reactor with a dielectric barrier of glass beads (GPR). The equipment setup approximates that described for FIGS. 3 and 4. The bench-scale NO$_x$ concentration is 160 ppm, which is in the range of uncontrolled combustion or incineration sources. The inlet concentration of NO is controlled by mixing 10% NO from a high pressure cylinder with dry compressed air. The NO$_2$ in the inlet stream is produced in the mixer by mixing a high concentration NO with air. The plasma-reacted No$_x$ emissions are further pretreated to remove the ozone therefrom and reduce the process temperature thereof. This phase is accomplished by reacting the ozone with a mild caustic solution, such as a 0.1M or CaCO$_3$ solution. An appropriately sized venturi chamber with an ejector integral with the GPR is used to apply the solution. The application of the caustic solution in the venturi chamber reduces the temperature of the effluent stream. After pretreatment, the resultant effluent, now primarily O$_2$, N$_2$, and NO$_2$, is passed through a chemical scrubber which uses a solution of sodium sulfite and sodium hydroxide, 5% by weight both, as the absorbent medium. The specifications for the tubular plasma reactor and the electrodes are as described above. The plasma reactor control is constructed to apply a voltage of up to 15 kV at 60 Hz AC under an effluent loading condition of 2 liters per minute, dry air.

With a voltage application of up to 10 kV, 60 Hz. AC, and an effluent loading of 2 liters per minute, 120 ppm NO and 40 ppm NO$_2$, an API 200AH NO$_x$ analyzer is used to measure the concentrations of NO, NO$_x$, and, by calculation, NO$_{21}$ simultaneously. The signal from the NO$_x$ analyzer comes from the light emitted from the chemiluminescent gas phase reaction of nitric oxide and ozone as follows:

$$NO + O_3 \rightarrow NO_2^* + O_2 \quad (5)$$

$$NO_2^* \rightarrow NO_2 + h\nu \quad (6)$$

The reaction of NO with ozone results in electronically excited NO$_2$ molecules as shown in Equation 5. The excited NO$_2$ molecules release their excess energy by emitting a photon and dropping to ground state as shown in Equation 6.

To measure NO concentration, the gas sample is blended with ozone in a reaction chamber. The ozone is generated in situ by a high voltage arc ozone generator. The resulting chemiluminescence is monitored through an optical filter by a high sensitivity photomultiplier positioned at one end of the reaction chamber. The filter/photomultiplier combination responds to light in a narrow wavelength band unique to the second reaction. The output from the multiplier is linearly proportional to the NO concentration.

The chemiluminescent analysis is only sensitive to NO; to measure NO$_x$ concentrations, the sample gas is diverted through a high temperature converter where the NO$_2$ is converted to NO and the total of NO$_x$, NO plus NO$_2$ is detected as NO. The NO$_2$ concentration is the difference between the two readings for NO$_x$ and NO. Signals from the NO$_x$ analyzer are continuously recorded on the strip chart recorder.

The actual measurements from the above are summarized in Table 2. The data indicate that NO$_2$ is scrubbed effectively with sodium sulfite aqueous solution. The outlet concentration of NO$_2$ can be as low as 1.1 ppm. When measurements are taken at a gas flowrate lower than 35 liters per minute, the outlet concentrations are below the detection limit of the chemiluminescent analyzer.

Figure 8:
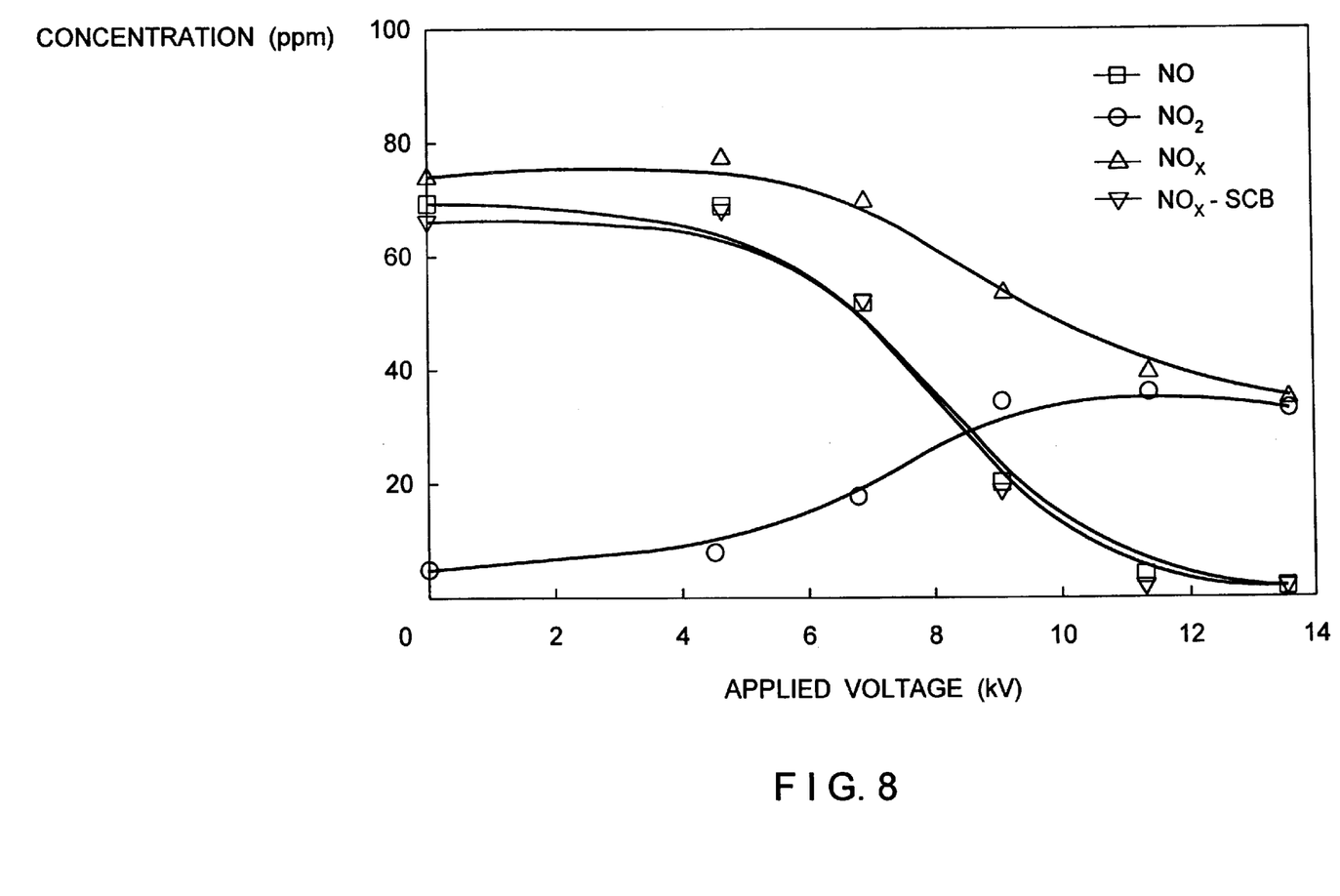
FIG. 8 is a graph showing the outlet concentrations of NO, $NO_2$, and $NO_x$ from a plasma reactor packed with glass beads and the outlet $NO_x$ concentrations from a chemical scrubber.

Referring now to FIG. 8, the outlet concentrations of NO, NO$_2$ and NO$_x$ of the plasma reactors with the glass bead dielectric are shown together with a curve labeled "NOx-SCB," which is the No$_x$ concentration in the chemical scrubber effluent. Concentrations of NO were superimposed on the curve indicated as NOx-SCB, which indicates that the scrubbing solution is effective in NO$_2$ absorption.

TABLE 2

Removal of NO$_2$ by Sodium Sulfite/Sodium Hydroxide Aqueous Scrubbing

| Scrubbing solution | Gas Flowrate (Lpm) | Concentration of NO$_2$ (ppm) | |
|---|---|---|---|
| | | Inlet | Outlet |
| Na$_2$SO$_3$/NaOH 5% by weight | 35 | 99 | 3.2 |
| | 43 | 111 | 5.4 |
| | 50 | 114 | 8.7 |
| | 58 | 116 | 12.3 |
| | 66 | 124 | 15.2 |
| | 74 | 119 | 20.1 |

The effluent temperature of the plasma reactor is measured to indicate the efficiency of the plasma reactor in converting the energy into electron energy. Low temperature operation is a characteristic and advantage of the nonthermal plasma process. Upon measuring the effluent temperatures when an electric field strength of 16.3 kV/cm, the operating temperatures are found to stabilize at 107° F.

Figure 9:
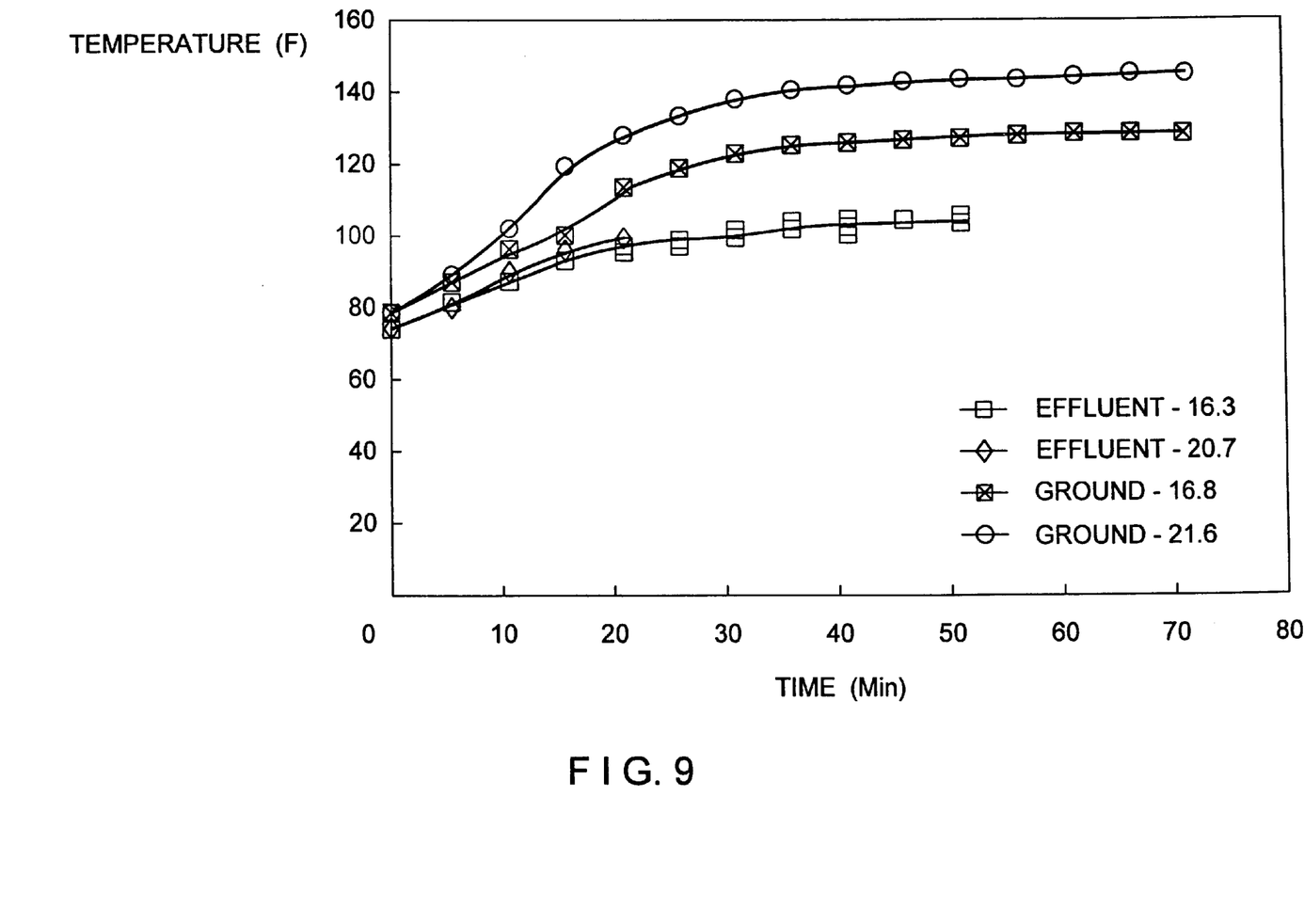
FIG. 9 is a graph showing the temperature profile for both effluents and the ground electrode of the packed bed plasma reactor of this invention.

With the glass bead packed plasma reactor, (GPR), as described above, the temperature readings at the ground electrode are also measured. Here with voltage applications of 16.8 kV and 21.6 kV, 60 Hz AC and a reactor loading of 2 liters of dry air per minute, the temperature profile is also taken. FIG. 9 shows the temperature profile for both effluents and ground electrode. With the electric field strength of 16.8 kV/cm applied across the electrodes, the operating temperature at the ground electrode increased to 130° F. in 30 minutes and stabilized in approximately one hour of operation. A similar trend of operating temperature is also observed with the electric field strength of 21.6 kV/cm. The operating temperature stabilized at 150° F. This indicates that the 2 mm glass wall effectively inhibits the direct discharge of plasma between electrodes.

Figure 10:
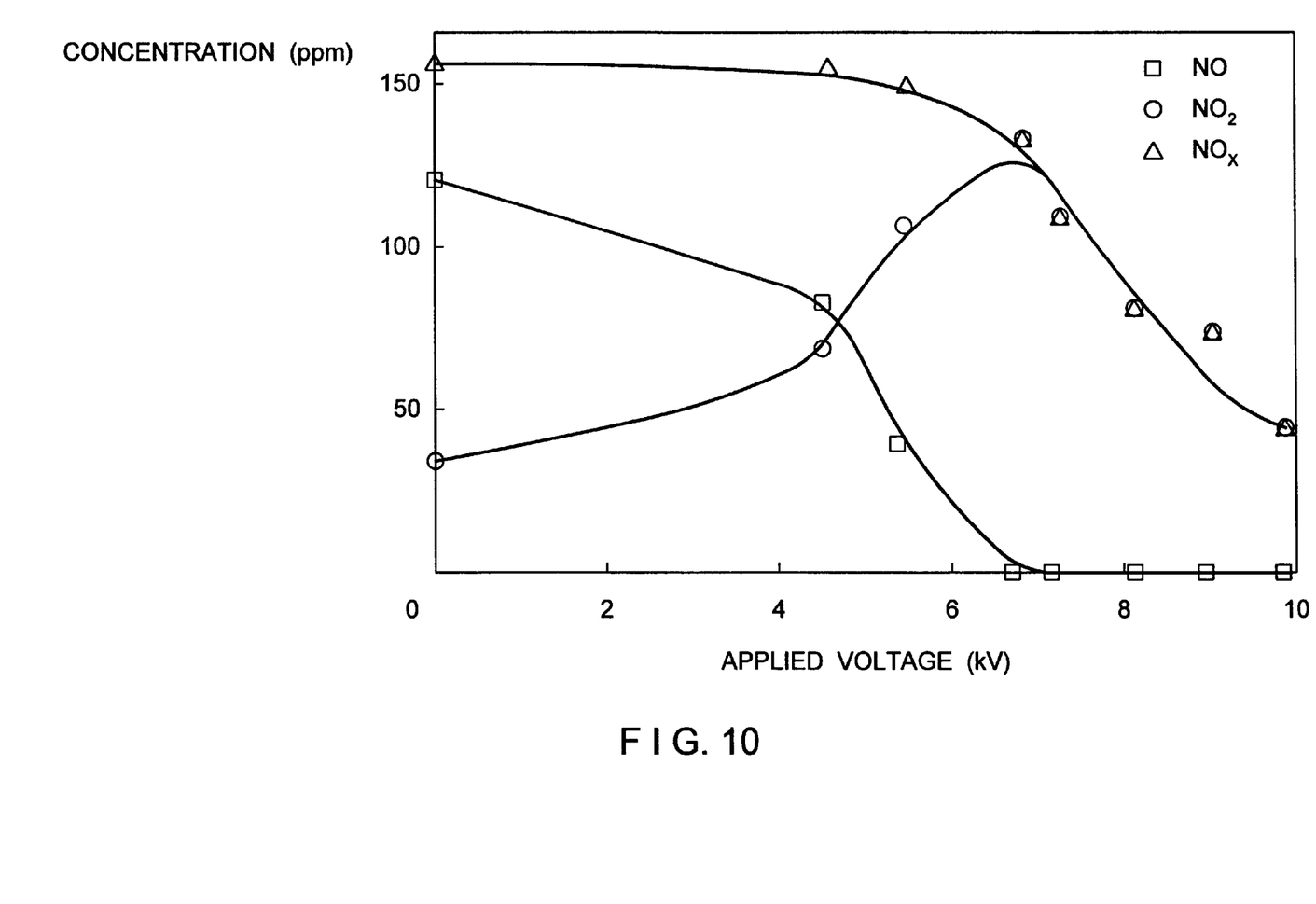
FIG. 10 is a graph showing the outlet concentrations of NO, $NO_x$, and $NO_x$ as a function of voltages applied to the packed bed plasma reactor of this invention.

Referring now to FIG. 10, the outlet concentrations of NO, $NO_2$ and $NO_x$ as a function of voltages applied to the reactor are shown. Up to 5.5 kV, the concentration of $NO_x$ remains the same, while more than 60% of incoming NO is converted to $NO_2$. Beyond that point, No begins to decline. At a voltage of 7 kV, all the NO is converted to $NO_2$ and the concentration of $NO_2$ reaches a maximum. Up to 10 kV, the concentration of $NO_x$ reaches a minimum of about 50 ppm. Considering a FPR for NO destruction, the efficiency is 100%. However, total $NO_x$ destruction is only about 70%.

Figure 11:
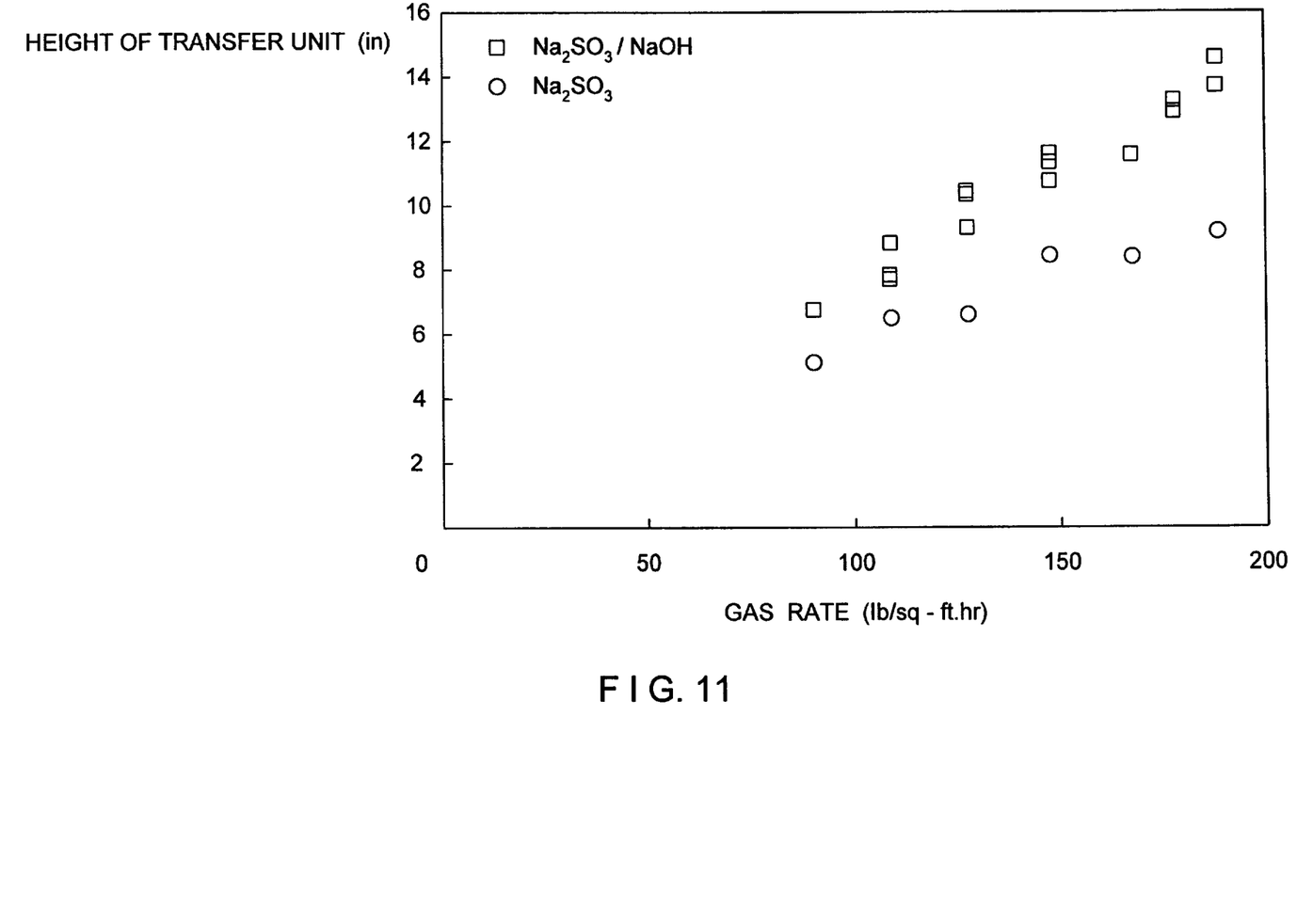
FIG. 11 is a graph showing the height of transfer unit (HTU) as a function of gas flowrate through the chemical scrubber of this invention.

Using Equation 3 and 4 above, and the data in Tables 1 and 2, the height of transfer unit (HTU) for each of the runs, supra, becomes available. The height of transfer unit as a function of gas flowrate is shown in FIG. 11. This shows that the scrubbing effectiveness of $NO_2$ decreases with the gas flowrate.

From the above set of data the effectiveness of glass beads as a dielectric barrier material is provided. Instead of a maximum of $NO_2$ concentration, the GPR shows a plateau. The decomposition percentage of a GPR is lower than that of a FPR. Although the removal efficiency of the corona-induced chemical scrubber is not affected, there is a concomitant increase in the chemical consumption in th e scrubber stage.

As described above, the corona-induced chemical scrubber is effective for $NO_x$ removal. The plasma discharge converts most of the NO to $N_2$ and and oxidizes the rest to $NO_2$. Sodium sulfite then removes all the $NO_2$ from the gas stream.

In the operation of the sys tem control of $NO_x$ emissions is accomplished by a plasma discharge device for pretreatment of flue gas effluents and by introducing the pretreated gaseous mixture into a chemical scrubber. It is within the contemplation of the present invention that instrumentation in the second pretreatment phase provide signals for adjusting the operations in both the plasma and the absorption sections. Using an ozone analyzer, ozone is found in the effluent of he ocnditioning section, the supply of the alkaline solution is increased and the voltagae applied to the plasma section is reduced. If NO is found in the effluent of the conditioning section, this indicates that the decomposition thereof is incomplete and a corresponding increase in the voltage applied to the plasma section is required. Further, if the temperature in the effluent of the conditioning section is high, the rate of recirculating the fluid is increased and the voltage applied to the plasma section is lowered.

The operational methodology includes the steps of:
(1) pretreating flue gas effluent by flowing the effluent through a plasma discharge device;
　a) applying a corona discharge to the gaseous mixture;
　b) optionally, interposing a dielectric material between the corona discharge and the gaseous mixture, said dielectric material selected frm barium titanate pellets and glass beads;
　　(i) decomposing the gaseous mixture thereby by to form nitrogen gas, $N_2$, and oxygen gas, $O_2$; and, a remaining mixture of nitric oxide, NO, and nitrogen dioxide, $NO_2$;
　　(ii) oxidizing the remaining mixture of nitric oxide, NO, and nitrogen dioxide, $NO_2$, to nitrogen dioxide, $NO_2$;
　c) further pretreating the effluent by removing the ozone therefrom and reducing the process temperature thereof, said further pretreating accomplished by the substeps of:
　　(i) reacting the ozone of the treated effluent with a caustic solution such as NaOH, or $CaCO_3$;
　　(ii) by the application of the caustic solution, reducing the temperature of the effluent stream;
　d) feeding the pretreated gaseous mixture of nitrogen, $N_2$, oxygen $O_2$; and, nitric oxide, $NO_{21}$ to the chemical scrubber;
(2) scrubbing the pretreated gaseous mixture in a chemical scrubber;
　(a) utilizing a chemical scrubbing medium of an aqueous solution of sodium bisulfite; and,
　(b) alternatively to substep (2) (a), above, utilizing a chemical scrubbing medium of an aqueous solution of sodium sulfite and sodium hydroxide.

Because many varying and different embodiments may be made within the scope to the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. An emission treatment system for removing oxides of nitrogen ($No_x$) from a gaseous effluent, said emission treatment system comprising:
　nonthermal plasma discharge means for receiving and modifying a gaseous effluent containing oxides of nitrogen (NOx) by applying a low energy plasma discharge thereto, so as to decompose the gaseous mixture to form substantially oxygen and nitrogen gases, nitrogen dioxide ($NO_2$) and ozone;
　pretreatment means for modifying said gaseous effluent process at said nonthermal plasma discharge means by substantially removing the ozone and lowering a temperature of the effluent through application of mildly alkaline solution so as to produce the effluent which is substantially a mixture of nitrogen, oxygen and nitrogen dioxide gases; and
　continuous scrubber means for receiving and treating said gas effluent preprocessed at said pretreatment means, so as to remove the nitrogen dioxide ($NO_2$) from said gas effluent by an aqueous absorbent solution.

2. The emission treatment system of claim 1, wherein said nonthermal plasma discharge means comprises at least a reaction vessel and a pair of electrodes at said vessel with a discharge gap formed therebetween.

3. The emission treatment system of claim 2, wherein said nonthermal plasma discharge means further comprises a dielectric barrier between said pair of electrodes for inhibiting a direct charge transfer therebetween.

4. The emission treatment system of claim 1, wherein said nonthermal plasma discharge means further comprises
　a nonthermal plasma reaction chamber;
　a pair of electrodes attached thereto with a discharge gap therebetween;
　a packing of a dielectric material between the electrodes, said packing adapted to inhibit a direct charge transfer between said electrodes;
　said nonthermal plasma reaction chamber upon application of a low energy input therethrough decomposes the majority of said flue gas effluent to nitrogen and oxygen and substantially oxidizes nitric oxide-to nitrogen dioxide.

5. The emission treatment system of claim 3, wherein said pretreatment means consists of a body having a first and second ends opposing each other, so that said gas effluent processed at the nonthermal plasma discharge means is fed from a first end and the mildly alkaline solution is fed from the second end in such a manner that the flows of the gaseous effluent and the mildly alkaline solution are opposite one another and the mildly alkaline solution is sprayed over a packing surface of the pretreatment means, so as to create a large interfacial area between the effluent and the liquid phase.

6. The emission treatment system of claim 5, wherein said pretreatment means further comprises thermal transfer means for removing heat generated by said nonthermal plasma discharge means and temperature control means for reducing the level of said plasma discharge while maintaining the level of the decomposition of said nitric oxide.

* * * * *